United States Patent
Wang

(10) Patent No.: US 8,533,969 B2
(45) Date of Patent: Sep. 17, 2013

(54) APPARATUS FOR ADJUSTING PLANARITY OF WORKPIECE

(75) Inventor: Xin-Yan Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 164 days.

(21) Appl. No.: 13/284,705

(22) Filed: Oct. 28, 2011

(65) Prior Publication Data

US 2013/0000137 A1 Jan. 3, 2013

(30) Foreign Application Priority Data

Jun. 30, 2011 (CN) .......................... 2011 1 0181658

(51) Int. Cl.
*G01B 5/25* (2006.01)
*G01B 5/20* (2006.01)

(52) U.S. Cl.
USPC ........................................... 33/533; 33/1 BB

(58) Field of Classification Search
USPC ............... 33/1 G, 1 BB, 501, 501.05, 501.08, 33/501.5, 533
See application file for complete search history.

(56) References Cited

U.S. PATENT DOCUMENTS

| 2,492,564 | A | * | 12/1949 | Gauthier | 33/533 |
| 5,231,767 | A | * | 8/1993 | Brinley | 33/533 |
| 6,870,382 | B2 | * | 3/2005 | Harris | 33/533 |
| 7,428,783 | B2 | * | 9/2008 | Li et al. | 33/533 |
| 7,748,133 | B2 | * | 7/2010 | Liu | 33/501.05 |
| 2009/0277030 | A1 | * | 11/2009 | Zhang | 33/533 |
| 2013/0104412 | A1 | * | 5/2013 | Fan | 33/533 |

* cited by examiner

*Primary Examiner* — G. Bradley Bennett
(74) *Attorney, Agent, or Firm* — Altis Law Group, Inc.

(57) ABSTRACT

An apparatus includes a base, a cover and a rotating shaft. The base includes a platform formed on the base for placing a workpiece, a supporting post protruding from the platform, and a pair of opposite connecting seats protruding from an end of the base. Each connecting seat defines a pin hole. The cover includes a board portion defining a positioning hole corresponding to the supporting post, a hollow rotating portion defining a through hole, and a connecting portion interconnecting the board portion and the rotating portion. The rotating shaft extends through the rotating portion with two ends received in the pin holes, rotatably interconnecting the cover to the base. The radius of the through hole is larger than that of the rotating shaft. When the board portion presses on the workpiece, the supporting post lifts the board portion.

12 Claims, 4 Drawing Sheets

APPARATUS FOR ADJUSTING PLANARITY OF WORKPIECE

BACKGROUND

1. Technical Field

The disclosure generally relates to apparatuses for adjusting planarity of workpieces, and particularly to an apparatus having protection function for the workpieces.

2. Description of Related Art

During the manufacture of portable electronic devices such as mobile phones, many manufacture processes such hot briquetting, or laser welding require that workpieces of the electronic devices have planar surfaces. The workpieces with non-planar or curved surfaces may have a negative influence on these processes, and lead to unqualified portable electronic devices. Nowadays, a clamping apparatus is commonly used to adjust the planarity of the workpieces. However, the clamping apparatus is inconvenient to be operated; the workpieces may easily be damaged by misoperation.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
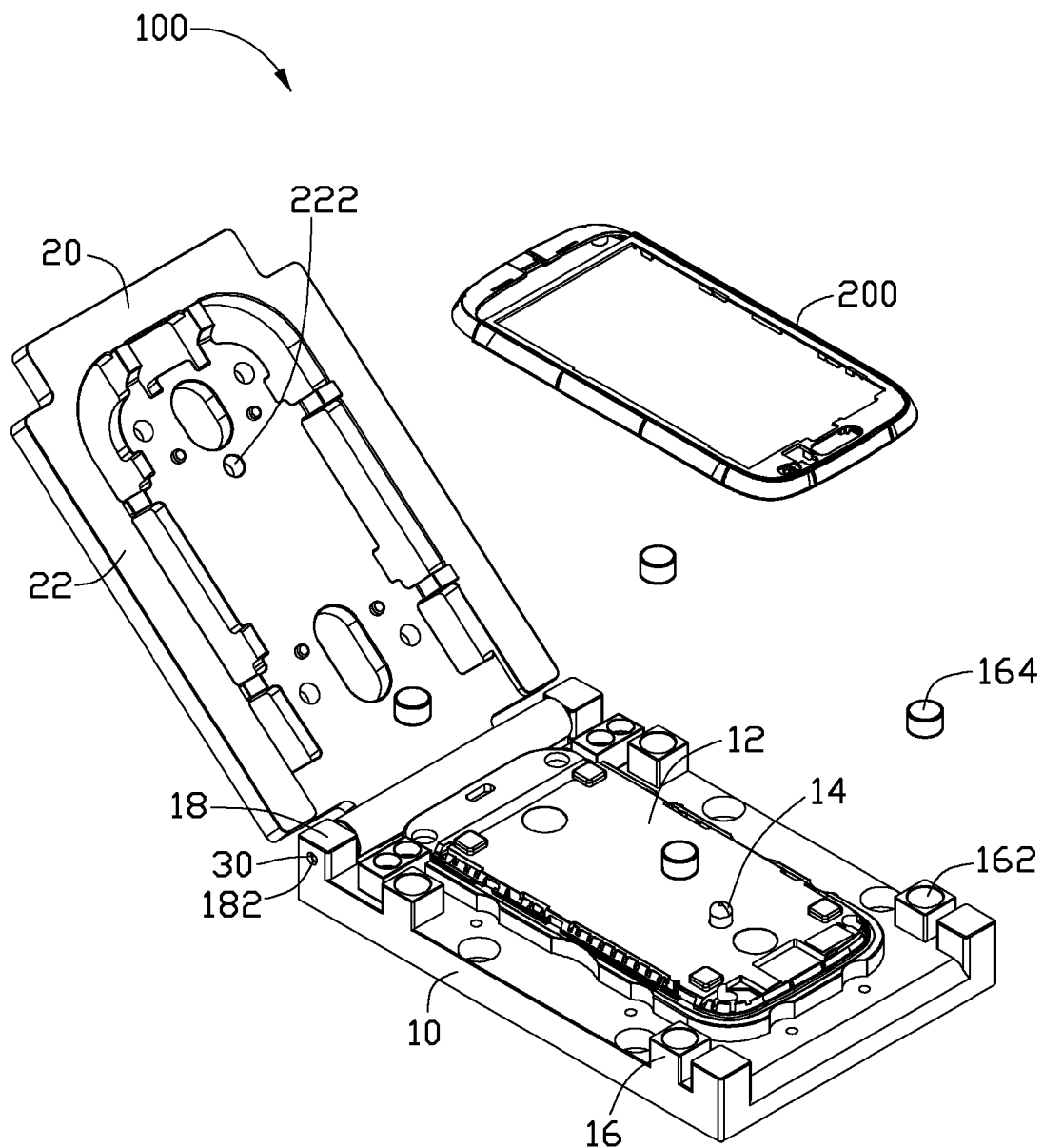
FIG. 1 is a schematic view of an apparatus for adjusting the planarity of a workpiece, according to an exemplary embodiment of the disclosure.

FIG. 1 is a schematic view of an apparatus 100 for adjusting a planarity of a workpiece 200, according to an exemplary embodiment of the disclosure. The workpiece 200 may be a frame of a mobile phone, a PDA or other electronic devices. The apparatus 100 includes a base 10, a cover 20 and a rotating shaft 30. The cover 20 is rotatably assembled to the base 10 through the rotating shaft 30. The workpiece 200 can be placed on the base 10. The cover 20 can be rotated toward the base 10 and presses on the workpiece 200 to adjust the planarity.

The base 10 is substantially rectangular. A platform 12 is formed on the base 10. The platform 12 matches with an inner surface of the workpiece 200. The workpiece 200 can be placed on the platform 12 with the periphery of the workpiece 200 attached to the platform 12.

Figure 3:
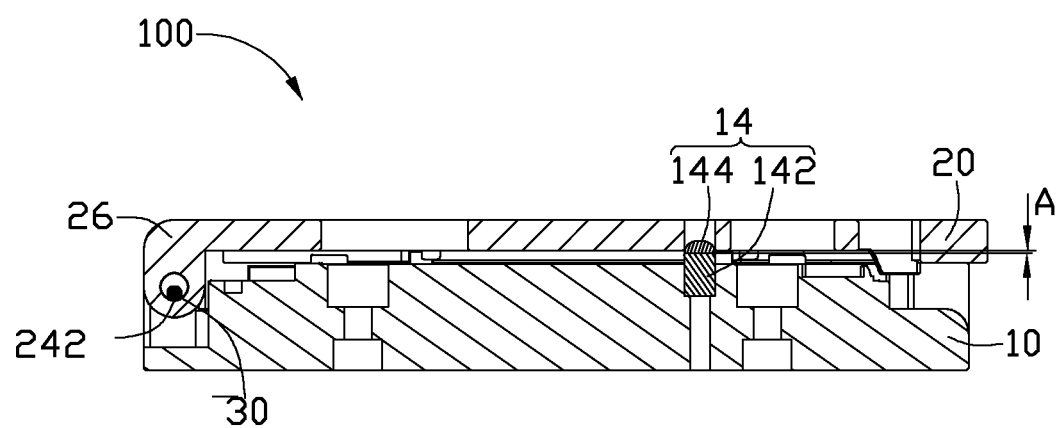
FIG. 3 is a cross-sectional view taken along line III-III of FIG. 2.

A supporting post 14 protrudes from the platform 12. Also referring to FIG. 3, the supporting post 14 includes a body portion 142 and a head portion 144. The body portion 142 is substantially cylindrical. The head portion 144 is substantially hemispherical and extends from an end of the body portion 142. The body portion 142 is secured in the platform 12. The head portion 144 can extend through the workpiece 200 placed on the platform 12 and partially received in the cover 20 when the cover 20 presses on the workpiece 200. Therefore, the cover 20 can be supported by the head portion 144 to lift to a noted height as A in FIG. 3 to avoid damaging the workpiece 200 from overpressure. The height A can be adjusted according to the thickness of the workpiece 200. The head portion 144 may be elastic.

Four protruding posts 16 respectively protrude from corners of the platform 12. Each protruding posts 16 defines a blind receiving hole 162. Each receiving hole 162 receives a magnetic member 164. When the cover 20 presses on the periphery of the workpiece 200, the magnetic members 164 attract the cover 20 toward to base 10. Thus, an enhanced pressure can be applied to the workpiece 200 to achieve a better planarity adjusting effect.

A pair of opposite connecting seats 18 protrudes from an end of the base 10 beside the platform 12. Each connecting seat 18 defines a pin hole 182 to install the rotating shaft 30.

Figure 2:
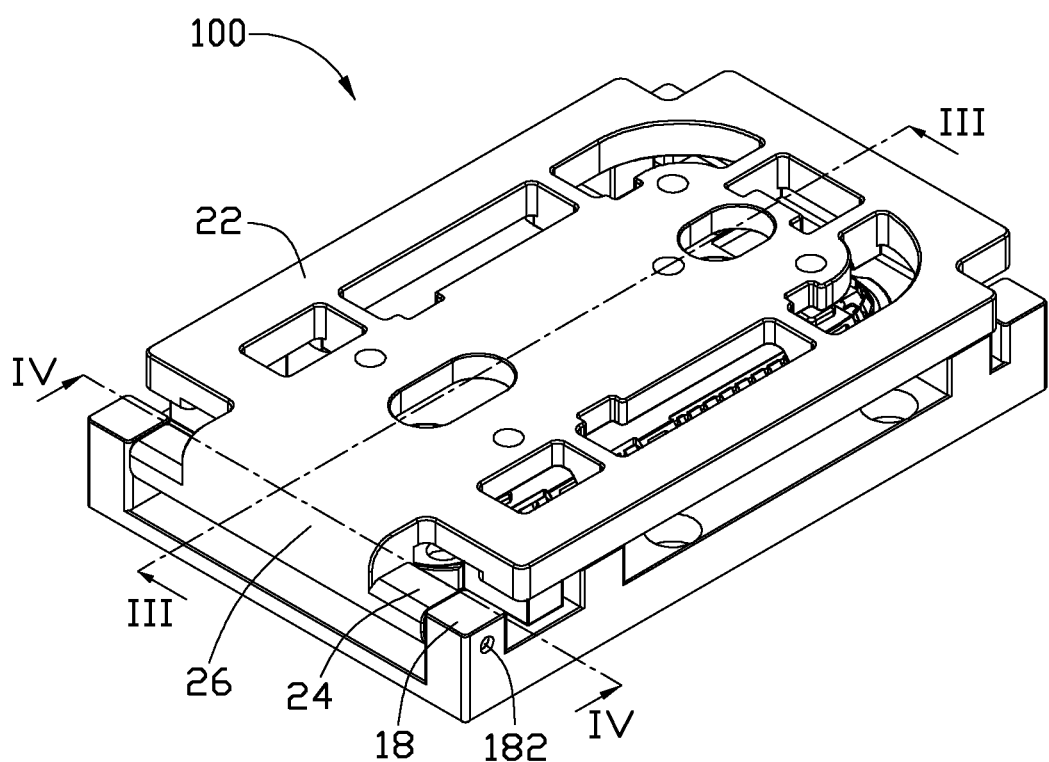
FIG. 2 is similar to FIG. 1, but showing a closed state of the apparatus of FIG. 1.

Also referring to FIG. 2, the cover 20 includes a board portion 22, a rotating portion 24 and a connecting portion 26 interconnecting the board portion 22 and the rotating portion 24. The board portion 22 is metal. The board portion 22 corresponds to the platform 10 and matches with an outer surface of the workpiece 200. A position hole 221 is defined in the board portion 22 corresponding to the supporting post 14. When the cover 20 presses on the workpiece 200, the head portion 144 is partially received in the position hole 22 to support the cover 20. In addition, the cover 20 is also secured by the head portion 144 and cannot be moved along a horizontal direction. Thus, the periphery of the workpiece 200 can be accurately pressed by the cover 20.

Figure 4:
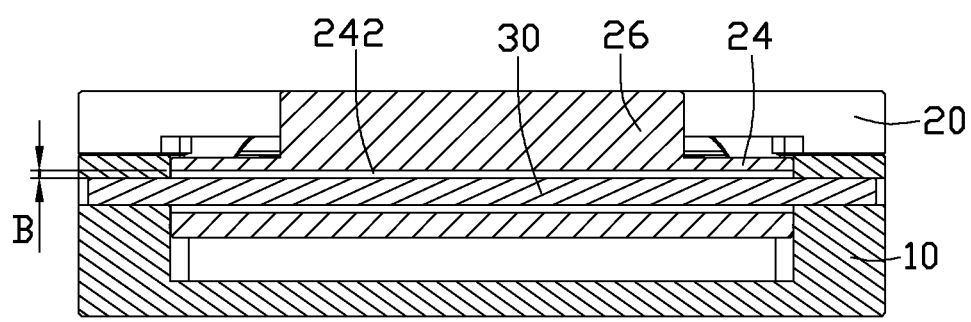
FIG. 4 is a cross-sectional view taken along line IV-IV of FIG. 3.

The rotating portion 24 is substantially a hollow cylinder. Also referring to FIG. 4, a through hole 242 is defined in the rotating portion 24 along a direction parallel to the board portion 22. A length of the rotating portion 24 is substantially the same as a distance between the two connecting seats 18. The rotating portion 24 is set between the connecting seats 18 with the through hole 242 aligned with the two pin holes 182.

The rotating shaft 30 extends through the through hole 242 with two ends received in the pin holes 182. A radius of the through hole 242 is larger than that of the rotating shaft 30. A difference B between the radii of the through hole 242 and the rotating shaft 30 is substantially equal to the height A of the cover 20 lifted by the supporting post 14. Thus, the cover 20 can have a shift relative to the base 10 along a vertical direction to adapt to the lifted height A. In this embodiment, the difference B between the radii of the through hole and the rotating shaft 30 is about 0.1-0.4 mm.

To adjust planarity of the workpiece 200, the workpiece 200 is placed on the platform 12. The cover 20 is rotated toward the platform 12 until the board portion 22 presses on the workpiece 200. The cover 20 can be controlled by a driving apparatus such as a cylinder (not shown). The head portion 144 is partially received in the position hole 222 and lifts the board portion 22 by the height A. Accordingly, the rotating portion 26 has a shift relative to the base 10 along a vertical direction in the through hole 242. Thus, the workpiece 200 is sandwiched between the board portion 22 and the platform 12, and the planarity can be adjusted by a proper pressure through the board portion 22. In addition, the magnetic members 164 also attract the board portion 22 toward the base 10 to enhance the pressure.

Therefore, the apparatus 100 can adjust the planarity of workpiece 200 by the proper pressure and avoid damage to the workpiece 200.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An apparatus for adjusting the planarity of a workpiece, the apparatus comprising:
   a base, comprising
      a platform formed on the base configured for placing the workpiece;
      a supporting post protruding from the platform; and
      a pair of opposite connecting seats protruding from an end of the base, each connecting seat defining a pin hole;
   a cover, comprising:
      a board portion defining a positioning hole corresponding to the supporting post;
      a hollow rotating portion defining a through hole; and
      a connecting portion interconnecting the board portion and the rotating portion; and
   a rotating shaft extending through the rotating portion with two ends received in the pin holes, rotatably interconnecting the cover to the base; wherein the radius of the through hole is larger than the radius of the rotating shaft, when the board portion presses on the workpiece, the supporting post lifts the board portion.

2. The apparatus of claim 1, wherein the position post includes a head portion and a body portion, the body portion is secured in the platform, when the board portion presses on the base, the head portion is partially received in the position hole and lifts the board portion.

3. The apparatus of claim 2, wherein the lifted height is substantially equal to the difference between the radii of the through hole and the rotating shaft.

4. The apparatus of claim 3, wherein the head portion is cylindrical, the body portion is hemispherical.

5. The apparatus of claim 3, wherein the difference between the radii of the through hole and the rotating shaft is substantially 0.1-0.4 mm.

6. The apparatus of claim 1, wherein the base further comprises a plurality of magnetic members set on the base besides the platform.

7. The apparatus of claim 4, wherein the base further comprises a plurality of protruding posts, each protruding post defines a receiving hole, the magnetic members are received in the receiving holes.

8. The apparatus of claim 1, wherein the platform matches with an inner surface of the workpiece and the board portion matches with an outer surface of the workpiece.

9. An apparatus for adjusting planarity of workpiece, the apparatus comprising:
   a base, comprising
      a platform formed on the base configured for placing the workpiece;
      a supporting post protruding from the platform; and
      a pair of opposite connecting seats protruding from an end of the base, each connecting seat defining a pin hole;
   a cover, comprising:
      a board portion defining a positioning hole corresponding to the supporting post;
      a hollow rotating portion; and
      a connecting portion interconnecting the board portion and the rotating portion; and
   a rotating shaft extending through the rotating portion with two ends received in the pin holes, rotatably interconnecting the cover to the base; wherein when the board portion presses on the workpiece, the supporting post lifts the board portion and the rotating shaft has a shift relative to the base along a vertical direction.

10. The apparatus of claim 9, wherein the position post includes a head portion and a body portion, the body portion is secured in the platform, when the board portion presses on the base, the head portion is partially received in the position hole and lifts the board portion.

11. The apparatus of claim 10, wherein the lifted height is substantially equal to the shift of the rotating shaft.

12. The apparatus of claim 10, wherein the difference between the radii of the through hole and the rotating shaft is substantially 0.1-0.4 mm.

* * * * *